United States Patent
Pexa

[11] 3,997,842
[45] Dec. 14, 1976

[54] METHOD AND APPARATUS FOR MONITORING MODULATION DEVICES FOR VIDEO SIGNALS

[75] Inventor: Güenther Pexa, Steinebach, Woerthsee, Germany

[73] Assignee: Siemens Aktiengesellschaft, Berlin & Munich, Germany

[22] Filed: May 19, 1975

[21] Appl. No.: 578,908

[30] Foreign Application Priority Data

May 31, 1974 Germany .................... 2426450

[52] U.S. Cl. .................. 325/67; 325/133
[51] Int. Cl.² ............................ H04B 17/00
[58] Field of Search ......... 325/49, 50, 67, 133; 178/DIG. 4; 358/10; 324/78 R, 78 F, 78 Z, 83 R, 118

[56] References Cited
UNITED STATES PATENTS

| | | | |
|---|---|---|---|
| 2,699,494 | 1/1955 | Albricht | 325/49 |
| 3,337,804 | 8/1967 | Palatinus | 325/67 |
| 3,396,240 | 8/1968 | Abbey et al. | 325/133 |

*Primary Examiner*—Robert L. Griffin
*Assistant Examiner*—Jin F. Ng
*Attorney, Agent, or Firm*—Hill, Gross, Simpson, Van Santen, Steadman, Chiara & Simpson

[57] ABSTRACT

A method for monitoring modulation devices for video signals includes the transmission of a selected carrier portion for carrier recovery. The carrier portion is produced at the input of a modulation device by removing the direct voltage contained in the video signal. A predetermined direct voltage is then injected and the direct voltage obtained at the output of a demodulation device is fed to a monitoring device to determine breakdown of a transmission assembly, or the direct voltage signal, or an out of phase condition between the modulation and demodulation devices.

2 Claims, 1 Drawing Figure

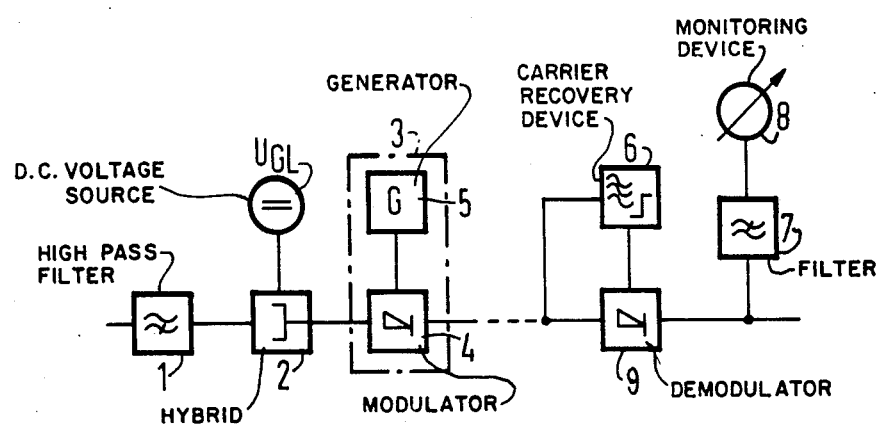

METHOD AND APPARATUS FOR MONITORING MODULATION DEVICES FOR VIDEO SIGNALS

BACKGROUND OF THE INVENTION

1. Field of the Invention

This invention relates to a method for monitoring modulation devices for video signals, and more particularly to such a method in which a selected carrier portion is transmitted for the purpose of carrier recovery.

2. Description of the Prior Art

Circuit arrangements for carrier recovery in TV, video and data transmission systems in which a selected carrier portion is added to the TF signal, or carrier signal, which carrier portion is employed for the purpose of carrier recovery, are known, for example, from the German Auslegeschrift No. 2,221,892.

SUMMARY OF THE INVENTION

The object of the present invention is to provide a method for monitoring modulation devices in such arrangements for carrier recovery with selected added carrier portions.

According to the invention, the procedure is carried out such that the carrier portion is produced at the input of a modulation device by removing the direct voltage contained in a video signal and injecting a selected direct voltage, and in that the direct voltage contained at the output of a demodulation device is fed to a monitoring device.

Through this method one obtains the advantage that all modulation devices can be monitored in a simple manner, without requiring additional transmission band width. At the same time, a simple monitoring of the phase of the demodulation carrier is obtained. Due to this simple, direct current monitoring, it is, moreover, not necessary to transmit a pilot, so that the requisite devices for this purpose, such as a pilot generator, two pilot stops, a band pass filter and a rectifier can be eliminated in the pilot receiver. The arrangement can also be employed for transmission level regulation.

BRIEF DESCRIPTION OF THE DRAWING

Other objects, features and advantages of the invention, its organization, construction and operation will be best understood from the following detailed description taken in conjunction with the accompanying drawing on which the single FIGURE illustrates a system with a modulation device for carrier recovery constructed and operating in accordance with the principles of the present invention.

DESCRIPTION OF THE PREFERRED EMBODIMENT

Referring to the drawing, the transmission end of a system is located at the input of a high pass filter 1 which filters out the direct current portion contained in an incoming video signal. A hybrid 2 is connected to the output of the high pass filter 1 and is connected to a direct current supply which provides a predetermined direct voltage $U_{GL}$.

At the output of the hybrid 2 the signal with the predetermined direct voltage injected therein is fed into a modulation device 3 which comprises a modulator 4 and a generator 5.

At the receiving end of the system, the direct current portion is again obtained by way of a demodulator 9 which is provided with a carrier by way of a carrier recovery device 6, as is well known in the art.

The direct current obtained at the output of the demodulator 9 is fed, by way of a filter 7 to a monitoring device 8. If the phase between the modulation device and the demodulation device does not correspond, this phase discrepancy is indicated by the monitoring device. The same type of indication occurs during a breakdown of one of the transmission assemblies, or the direct voltage signal, respectively.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for monitoring modulation devices for video signals containing a high frequency portion and a direct current portion, comprising the steps of: removing the direct current portion of a video signal to obtain the
   high frequency portion; adding a selected direct current portion to the high frequency portion
   to obtain a predetermined signal; modulating the predetermined signal with a carrier and transmitting
   the modulated product; receiving the transmitted signal; recovering the carrier from the received signal; demodulating the received signal with the recovered carrier to
   obtain a direct voltage signal; and monitoring the direct voltage signal to determine equipment failure
   and phasing between the modulation and demodulation devices.

2. Apparatus for monitoring modulation devices for video signals containing a high frequency portion and a direct current portion, comprising: means for removing the direct current portion of a video signal to
   obtain the high frequency portion; means for adding a selected direct current portion to the high
   frequency portion to obtain a predetermined signal; means for modulating the predetermined signal with a carrier and
   transmitting the modulation product; means for receiving the transmitted signal; means for recovering the carrier from the received signal; means for demodulating the received signal with the recovered
   carrier to obtain a direct voltage signal; and means for monitoring the direct voltage signal to determine
   equipment failure and phasing between the modulation and demodulation devices.

* * * * *